United States Patent [19]

Löbig

[11] Patent Number: 4,836,044
[45] Date of Patent: Jun. 6, 1989

[54] CONNECTING ROD

[75] Inventor: Arnold Löbig, Rüsselsheim, Fed. Rep. of Germany

[73] Assignee: General Motors Corporation, Detroit, Mich.

[21] Appl. No.: 207,472

[22] Filed: Jun. 16, 1988

[30] Foreign Application Priority Data

Jul. 28, 1987 [DE] Fed. Rep. of Germany ....... 8710328

[51] Int. Cl.⁴ ............................................... G05G 1/00
[52] U.S. Cl. ................... 74/579 E; 74/579 R; 29/156.5 A; 123/197 AC
[58] Field of Search ............ 74/579 E, 579 R, 579 F, 74/581, 44; 29/156.5 A; 123/197 AB, 197 R, 197 AC; 92/187

[56] References Cited

U.S. PATENT DOCUMENTS

| 1,130,982 | 3/1915 | Kinkead | 74/579 E |
| 1,434,143 | 10/1922 | Patterson et al. | 74/579 E |
| 2,428,602 | 10/1947 | Yingling | 74/579 E |
| 3,390,925 | 7/1968 | Fangman | 74/579 E |
| 4,541,304 | 9/1985 | Chikugo et al. | 123/197 AB X |
| 4,555,961 | 12/1985 | Fischer | 74/579 E |

FOREIGN PATENT DOCUMENTS

| 861174 | 12/1952 | Fed. Rep. of Germany | 74/579 E |
| 863732 | 1/1953 | Fed. Rep. of Germany | 74/579 E |
| 3225325 | 1/1984 | Fed. Rep. of Germany | 74/579 E |
| 3416011 | 5/1985 | Fed. Rep. of Germany | 74/579 E |
| 967692 | 11/1950 | France | 74/579 E |
| 375141 | 6/1932 | United Kingdom | 74/579 E |
| 981446 | 1/1965 | United Kingdom | 74/579 E |

Primary Examiner—Richard E. Moore
Assistant Examiner—Vinh Luong
Attorney, Agent, or Firm—Robert J. Outland

[57] ABSTRACT

A multi-piece connecting rod has the large eye end formed with a yoke receiving a bearing bracket supported on an angled wedge surface by an angled counter surface of a wedge. The wedge is carried by a pin-like bolt between legs of the yoke and includes a threaded portion engaged by the bolt for tightening the angled wedge surfaces to clamp the bearing bracket in position.

4 Claims, 1 Drawing Sheet

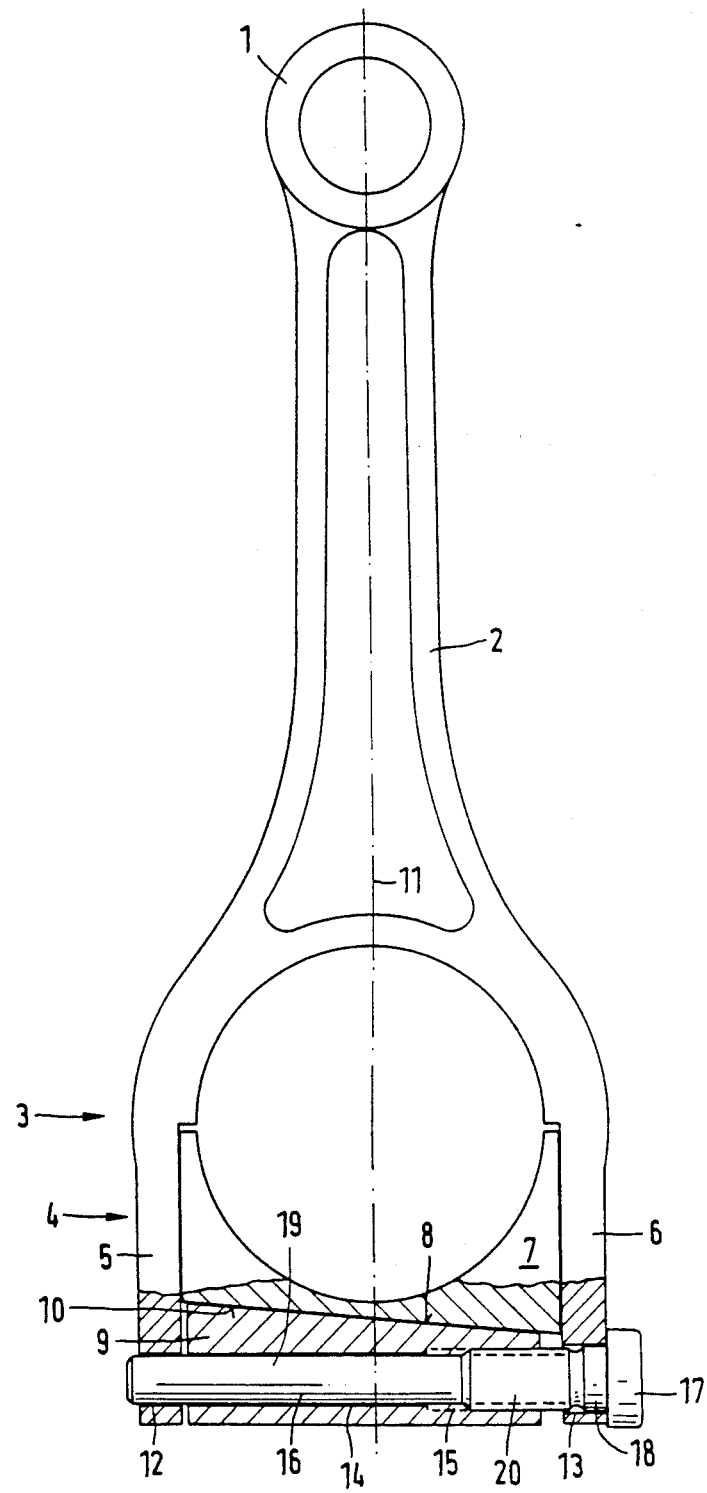

CONNECTING ROD

TECHNICAL FIELD

This invention relates to a connecting rod having an upper connecting rod eye, a connecting rod shank and a split lower connecting rod eye for receiving a crank pin, the connecting rod bearing cap of the lower connecting rod eye being in the form of a bearing bracket which is provided on the side remote from the connecting rod eye with a tapered surface which engages a complementary tapered counter surface, said counter surface being adapted for movement relative to the tapered surface of the bearing bracket by an adjusting means.

BACKGROUND

A connecting rod of this type, which is made of a composite fiber material, has been disclosed in the German Offenlegungsschrift DE-OS 34 16 011. In this connecting rod, the two connecting rod eyes are surrounded by a flexible clamping strap which encloses the connecting rod eyes from the outside. The strap is tensioned to exert a predetermined biasing force so that, when the connecting rod is in operation, the clamping strap is always subjected to a load in the tensile range and the connecting rod shank in the compression range. The clamping strap is associated with a mechanical tensioning device including a clamping bolt which extends transversely to the axial centerline of the connecting rod and which has attached to each of its ends a respective end of the clamping strap. The clamping bolt is provided with threaded portions which enable the clamping bolt to be adjusted along with a wedge and a wedge counter surface. The clamping strap, while in the relaxed condition, is placed over the connecting rod eyes and the connecting rod shank and is then adjusted to a predetermined load so that during operation the tensile loads will not cause the clamping strap to be appreciably stretched and the form-locking connection and load bearing engagement between the tensioning strap and the connecting rod shank will be fully maintained.

The disadvantage of this prior-art connecting rod is that the clamping arrangement for the bearing bracket consists of three parts, namely two nuts and a clamping bolt. Furthermore, the clamping bolt is relatively complex in design since it is a non-circular part with threaded ends which cannot be made on a lathe, nor can it be simply cast or be made on a milling machine. But more importantly, in the case of a connecting rod made of metal, especially one that is cast, the clamping bolt cannot be mounted into a bearing yoke for the bearing bracket. In the case of the prior-art connecting rod, this is possible only because the clamping straps are flexible and therefore enable the clamping bolt with the threaded ends to be placed therebetween. Another shortcoming in this arrangement is that the assembly operation is costly and time consuming because the two threaded ends must be accessible to enable adjustment of the clamping bolt.

SUMMARY OF THE INVENTION

It is an object of the present invention to provide a connecting rod of the type described in the foregoing which enables, even in the case of a rigid connecting rod made of metal, such a a cast connecting rod, the loading of the bearing bracket to be accomplished with a minimum number of components, and wherein the manufacture of the clamping means can be simplified.

This object is accomplished by forming the region of the lower connecting rod eye as a bearing yoke which has a bearing bracket mounted between two legs thereof. The bearing bracket is supported by a bolt which extends through bores in the yoke legs adjacent to their free ends and through a bore in a wedge that is adjustably carried between the legs. The wedge is provided with an angled counter surface that engages a mating angled wedge surface of the bearing bracket for adjustably clamping the bearing bracket in the yoke. A threaded portion of the bolt engages a corresponding threaded portion of the wedge bore to provide for adjustment of the wedge.

The clamping means according to the invention is comprised of only two parts, namely the wedge and the bolt. The latter is in the form of a stepped diameter headed support pin provided with a threaded portion near the head end for adjusting the lateral position of the wedge but, for simplicity, this threaded pin is herein referred to as a bolt. The bolt can be manufactured on a lathe, and the wedge may be made as a cast part or machined from a slug as on a milling machine.

When assembling the connecting rod on a crankpin, the bearing bracket is inserted between the legs of the bearing yoke and the wedge is positioned with its angled counter surface in engagement with the corresponding angled wedge surface of the bearing bracket. The bolt is then inserted through the bores of the legs and the wedge so that its threaded portion engages the corresponding threaded portion of the wedge bore.

As long as the wedge is positioned at its farthest distance from the head of the bolt, the bolt will retain the wedge in position without loading the bearing bracket by causing a clamping force to be exerted between the wedge and the bearing bracket. As the bolt is threaded further into the wedge, the wedge will be caused to move towards the head of the bolt, and a clamping force will be generated between the wedge and the bearing bracket which will cause the bearing bracket to be tightened or loaded.

This operation is accomplished by merely turning the head of the bolt with a suitable tool and, thus, eliminates the need for any additional manipulations at the end of the bearing yoke.

Preferably, as shown, the wedge has its threaded portion located at the smaller end, facing the head of the bolt. As a result, the unthreaded length of the wedge bore, which acts as a bearing for the wedge on the unthreaded portion of the bolt, is relatively large. Furthermore, it is advantageous that the bores of the legs of the bearing yoke through which the bolt extends and the bore of the wedge in the region of the enlarged threaded end thereof be closely fitted to the diameter of the bolt.

Other features of the invention will be apparent from the description of the single figure. It should be appreciated that all the individual features and combinations thereof must be considered to include any modifications that fall within the concept of the invention.

BRIEF DRAWING DESCRIPTION

The single FIGURE is a side elevation of a connecting rod according to the invention with part of the connecting rod illustrated in cross section.

DETAILED DESCRIPTION

In the illustrated embodiment, the connecting rod is comprised, essentially, of an upper connecting rod eye 1 for receiving a piston pin (not illustrated in the drawing), a connecting rod shank 2 and a split lower connecting rod eye 3 for receiving a crankpin (also not illustrated in the drawing). In the region of the lower connecting rod eye, the connecting rod is in the form of a bearing yoke 4 having second and first legs 5, 6, respectively, and a bearing bracket 7 clamped between the legs to enclose the crankpin. The bracket 7 closes the open end of the yoke which faces away from the connecting rod shank 2. The bearing bracket 7 is provided on its side facing away from the connecting rod shank 2 with a tapered or angled wedge surface 8 which is in engagement with a wedge 9 having a correspondingly tapered or angled counter surface 10. The free ends of the legs 5 and 6 are provided with concentric bores 12 and 13 which extend transversely to the axial center line 11 of the connecting rod, and the wedge 9 is provided with a concentric bore 14 and a threaded portion 15 formed in one end of the bore. The bores 12, 13 and 14 are adapted to receive a bolt 16 with a hexagon head having an innermost surface that, when installed, engages the outer surface of the leg 6 of the bearing yoke 4. The bolt includes a first guide portion 18 adjacent to the head 17 and of a diameter slightly smaller than the inner diameter of the bore 13 in which it is received. A second guide portion 19 is formed by the portion of the bolt extending from the end opposite the head and has a diameter slightly smaller than the bores 12 and 14 through which it extends. Between the two guide portions 18 and 19, the bolt 16 has a threaded portion 20 which is mateable with the threaded portion 15 of wedge 9.

After insertion of the bearing bracket 7, with its angled surface 8 rising (i.e. angled away from the crankpin opening) in the direction of the first leg 6, wedge 9 is inserted with its angled counter surface 10 facing the angled surface 8 of the bearing bracket and with a thicker end of the wedge 9 in or near engagement with the second leg 5 of the bearing yoke 4. Thereafter, bolt 16 is inserted through bores 12 and 13 of the bearing yoke and through bore 14 of wedge 9, and its threaded portion 20 is threaded into the threaded portion 15 of wedge 9 until the inner surface of the bolt head 17 engages the outer surface of the first leg 6 of the bearing yoke 4. Upon further rotation of bolt 16, the threaded portion 20 causes wedge 9 to move toward leg 6 of the bearing yoke 4 which causes the bearing bracket 7 to be urged or loaded against the yoke in the direction of the crankpin opening along the line of the axial center line 11 of the connecting rod 2.

The embodiments of the invention in which an exclusive property or privilege is claimed are defined as follows:

1. A connecting rod having a split lower eye including a crankpin opening, wherein said eye comprises a bearing yoke including first and second spaced legs, a bearing bracket received in the yoke between said legs and forming with the yoke said crankpin opening, said bearing bracket having an angled wedge surface on a side opposite the crankpin opening and inclined away from said opening in a direction toward said first leg, a wedge member disposed between the legs on said opposite side of the bearing bracket and having an angled counter surface engaging said angled wedge surface of the bearing bracket, said wedge member being the sole means for urging said bearing bracket against the yoke in a direction toward said crankpin opening, the wedge member being substantially shorter than the distance between said legs to permit lateral adjusting movement of the wedge member between the legs and being initially installed in a position spaced from said first leg to permit subsequent lateral adjustment of the wedge member toward said first leg to urge said bearing bracket member toward said crankpin opening, and a bolt extending laterally through coaxial bores in said wedge member and said legs to retain said wedge member between said legs and having means for restraining lateral motion of the bolt in a direction from said first leg toward said second leg, said bolt and said bore of the wedge member having coacting threaded portions with interengaging threads to laterally adjust the wedge member toward said first leg upon prescribed rotation of said bolt in said bores.

2. A connecting rod as in claim 1 wherein the means for restraining lateral motion of the bolt is a head at one end engaging an outer side of the first leg of the yoke.

3. A connecting rod as in claim 2 wherein the bolt threaded portion has outer and inner diameters comprising respectively diameters across apices and roots of the threads and the bolt includes stepped diameters adjacent the threaded portion including a first diameter between the head and the threaded portion and at least as large as the outer diameter of the threaded portion and a second diameter between the threaded portion and the end opposite the head and at least as small as the inner diameter diameter of the threaded portion, the pin receiving bores of the legs and wedge outside of the threaded portion being sized only slightly larger than respective portions of the stepped diameters received therein.

4. A connecting rod as in claim 3 wherein the coacting threaded portion of the bolt is near the head end and the threaded portion of the wedge member is at the end of its bore toward the first leg of the yoke.

* * * * *